US012725396B2

(12) United States Patent
Habili et al.

(10) Patent No.: US 12,725,396 B2
(45) Date of Patent: Sep. 1, 2026

(54) ILLUMINATION SPECTRUM RECOVERY

(71) Applicant: Commonwealth Scientific and Industrial Research Organisation, Australian Capital Territory (AU)

(72) Inventors: Nariman Habili, Acton (AU); Jeremy Oorloff, Acton (AU)

(73) Assignee: Commonwealth Scientific and Industrial Research Organisation, Acton (AU)

( * ) Notice: Subject to any disclaimer, the term of this patent is extended or adjusted under 35 U.S.C. 154(b) by 358 days.

(21) Appl. No.: 18/254,589

(22) PCT Filed: Nov. 24, 2022

(86) PCT No.: PCT/AU2022/051404
§ 371 (c)(1),
(2) Date: May 25, 2023

(87) PCT Pub. No.: WO2023/092179
PCT Pub. Date: Jun. 1, 2023

(65) Prior Publication Data

US 2024/0371124 A1 Nov. 7, 2024

(30) Foreign Application Priority Data

Nov. 24, 2021 (AU) ................................ 2021903790

(51) Int. Cl.
*G06V 10/60* (2022.01)
*G06V 10/34* (2022.01)
(Continued)

(52) U.S. Cl.
CPC .............. *G06V 10/60* (2022.01); *G06V 10/34* (2022.01); *G06V 10/58* (2022.01); *G06V 10/774* (2022.01); *G06V 10/82* (2022.01)

(58) Field of Classification Search
CPC ........ G06V 10/60; G06V 10/34; G06V 10/58; G06V 10/774; G06V 10/82; G06N 3/0464;
(Continued)

(56) References Cited

U.S. PATENT DOCUMENTS 7,295,716 B1 * 11/2007 Chinen ................ H04N 1/6086 358/509
11,615,512 B2 * 3/2023 Neofytou ................ G06N 3/08 382/159

(Continued)

FOREIGN PATENT DOCUMENTS

CN 113008371 A 6/2021

OTHER PUBLICATIONS

Robles-Kelly, A., & Wei, R. (2018). A Convolutional Neural Network for Pixelwise Illuminant Recovery in Colour and Spectral Images. 2018 24th International Conference on Pattern Recognition (ICPR), 109-114. (Year: 2018).*

(Continued)

*Primary Examiner* — Stephen R Koziol
*Assistant Examiner* — Michael Kim Maiden
(74) *Attorney, Agent, or Firm* — Nixon & Vanderhye P.C.

(57) ABSTRACT

This disclosure concerns processing of electronic images, such as hyperspectral or multispectral images. In particular, this disclosure provides methods, software and computer systems for estimating an illumination spectrum of a digital image. A processor applies a neural network to the digital image by calculating three-dimensional convolutions in one or more convolutional layers of the neural network. The three-dimensional convolutions comprise a convolution along a spectral dimension. The processor then evaluates an output layer, connected to the one or more convolutional layers in the neural network. The output layer has multiple
(Continued)

output values that each provide an intensity value for a respective band of the illumination spectrum of the digital image.

18 Claims, 9 Drawing Sheets

(51) Int. Cl.
*G06V 10/58* (2022.01)
*G06V 10/774* (2022.01)
*G06V 10/82* (2022.01)

(58) Field of Classification Search
CPC ...................... G06N 3/09; G06N 3/045; G06T 2207/20084; G06T 7/90; G06T 5/92; G06T 3/40; G06T 5/70; G06T 2207/10036; G06T 2207/20081
See application file for complete search history.

(56) References Cited

U.S. PATENT DOCUMENTS

| | | | | |
|---|---|---|---|---|
| 2017/0304732 | A1* | 10/2017 | Velic | G06V 10/774 |
| 2018/0308260 | A1* | 10/2018 | Robles-Kelly | G01J 3/28 |
| 2022/0116549 | A1* | 4/2022 | Neofytou | H04N 19/30 |

OTHER PUBLICATIONS

Robles-Kelly, A., & Wei, R. (2018). A Convolutional Neural Network for Pixelwise Illuminant Recovery in Colour and Spectral Images. 2018 24th International Conference on Pattern Recognition (ICPR), 109-114. https://doi.org/10.1109/ICPR.2018.8546178) in view of Chinen (U.S. Pat. No. 7295716 B1) (Year: 2018).*

Simonyan et al., "Very Deep Convolutional Networks for Large-Scale Image Recognition," International Conference on Learning Representations, Apr. 10, 2015, 14 pages.

He et al., "Deep Residual Learning for Image Recognition," IEEE Conference on Computer Vision and Pattern Recognition, 2016, pp. 770-778.

Bianco Simone et al., Single and Multiple Illuminant Estimation Using Convolutional Neural Networks, IEEE Transactions on Image Processing, 2017, pp. 4347-4362, vol. 26, No. 9.

Cardei Vlad et al., Estimating the scene illumination chromaticity by using a neural network, J. Opt. Soc. Am. A, Accepted Jul. 17, 2002, pp. 2374-2386, vol. 19.

Choi Ho-Hyoung et al., CNN-Based Illumination Estimation with Semantic Information, Applied Sciences, Published Jul. 13, 2020, 17 pages.

Koščević, K. et al., Iterative Convolutional Neural Network-Based Illumination Estimation, IEEE Access, Feb. 17, 2021, pp. 26755-26765, vol. 9.

Xu H. et al., Multiple Spectral Resolution 3D Convolutional Neural Network for Hyperspectral Image Classification, Remote Sens, 2021, pp. 1-21, vol. 13, No. 1248.

International Search Report for PCT/AU2022/051404 mailed Feb. 9, 2023, 5 pages.

Written Opinion of the ISA for PCT/AU2022/051404 mailed Feb. 9, 2023, 4 pages.

Australian International-Type Search Report for 2021903790 mailed Dec. 24, 2021, 20 pages.

Extended European Search Report mailed Jun. 25, 2025 in European Application No. 22893972.4, 7 pages.

Koundinya Sriharsha et al., "2D-3D CNN Based Architectures for Spectral Reconstruction from RGB Images", 2018 IEEE/CVF Conference on Computer Vision and Pattern Recognition Workshops (CVPRW), IEEE, Jun. 18, 2018 (Jun. 18, 2018), pp. 957-964, XP033475422, DOI: 10.1109/CVPRW.2018.00129 [retrieved on Dec. 13, 2018].

Robles-Kelly, "Single Image 1-15 Spectral Reconstruction for Multimedia Applications", Multimedia, ACM, 2 Penn Plaza, Suite 701 New York NY 10121-0701 USA, Oct. 13, 2015 (Oct. 13, 2015), pp. 251-260, XP058076418, DOI: 10.1145/2733373.2806233, ISBN: 978-1-4503-3459-4.

Li Yuqi et al., "Multispectral 1-15 illumination estimation using deep unrolling network", 2021 IEEE/CVF International Conference on Computer Vision (ICCV), IEEE, Oct. 10, 2021 (Oct. 10, 2021), pp. 2651-2661, XP0340939889, DOI: 10-1109/ICCV48922.2021.00267 [retrieved on Feb. 10, 2022].

* cited by examiner

ILLUMINATION SPECTRUM RECOVERY

CROSS-REFERENCE TO RELATED APPLICATIONS

This application is the U.S. national phase of International Application No. PCT/AU2022/051404 filed Nov. 24, 2022, which designated the U.S. and claims priority to Australian Provisional Patent Application No 2021903790 filed on 24 Nov. 2021, the entire contents of each of which are hereby incorporated by reference.

TECHNICAL FIELD

The disclosure concerns processing of electronic images, such as hyperspectral or multispectral images. In particular this disclosure provides methods, software and computer systems for estimating an illumination spectrum of an image.

BACKGROUND

The appearance of an object in a scene depends significantly on the illuminant colour. Therefore, the recovery of the light power spectrum finds applications in recognition, surveillance and visual tracking. Despite its importance, the recovery and identification of illuminant colours in the scene has proven to be a difficult task in uncontrolled real world imagery.

Traditionally, the illumination spectrum of a hyperspectral image is recovered by measuring the illumination reflected off a white reference target (or Spectralon) placed in the scene. However, placing a white reference panel in the scene and then estimating the illumination spectrum is a time-consuming endeavour and not always practical. For example, if images are captured from a moving sensor platform (e.g., a vehicle), it is not feasible to use a white reference panel for every image.

FIG. 1 illustrates an example scene 100 comprising a mountain 102 illuminated by the sun 104, which has a specific illumination spectrum. When capturing scene 100, conventional cameras perform white balance, which is often difficult without a white reference.

FIG. 2 illustrates the example scene 100 in more detail. The sun (illuminant) 104 has an illuminant spectrum 204. The mountain 102 has a reflectance spectrum 210. For simplicity only one reflectance spectrum is shown but of course, many different reflectance spectra of many different materials may be present.

When the light from the illuminant 104 hits the mountain 102, the illuminant spectrum 204 is multiplied by the reflectance spectrum 210 and the resulting spectrum reaches a sensor 212 as a radiance spectrum 214. The sensor 212 has a number of pixels, such as one million, and captures for each pixel location a separate sampled version of the radiance spectrum.

FIG. 3 illustrates a data structure 300 for the multispectral image data. The data structure 300 comprises layers, one for each wavelength. Each layer represents the radiance values for one wavelength and all pixels and one example pixel 302 is highlighted. The values of pixel 302 for different wavelengths, that is the radiance values from lower layers at the same location as pixel 302, represent a radiance spectrum also referred to as the image spectrum or input spectrum.

Any discussion of documents, acts, materials, devices, articles or the like which has been included in the present specification is not to be taken as an admission that any or all of these matters form part of the prior art base or were common general knowledge in the field relevant to the present disclosure as it existed before the priority date of each claim of this application.

Throughout this specification the word "comprise", or variations such as "comprises" or "comprising", will be understood to imply the inclusion of a stated element, integer or step, or group of elements, integers or steps, but not the exclusion of any other element, integer or step, or group of elements, integers or steps.

SUMMARY

A method for determining an illumination spectrum in a digital image comprises:

- applying a neural network to the digital image by:
  - calculating three-dimensional convolutions in one or more convolutional layers of the neural network, the three-dimensional convolutions comprising a convolution along a spectral dimension; and
  - evaluating an output layer, connected to the one or more convolutional layers in the neural network, the output layer having multiple output values that each provide an intensity value for a respective band of the illumination spectrum of the digital image.

It is an advantage that the neural network comprises three-dimensional convolutions along a spectral dimension. As a result, spectral information can be trained efficiently. It is a further advantage that the output values provide intensity values for respective illumination bands. As a result, the method directly produces an accurate illumination spectrum.

In some embodiments, the method further comprises training the neural network by applying a smoothing function to the output values of the output layer to calculate a cost value that is to be minimised during training.

In some embodiments, the smoothing function comprises a cubic spline approximation to the output values of the output layer.

In some embodiments, the method further comprises down-sampling bands of the digital image.

In some embodiments, the one or more convolutional layers are configured to down-sample the bands of the digital image.

In some embodiments, the method further comprises up-sampling a result of the convolutional layer.

In some embodiments, the method further comprises training the neural network on multiple training images.

In some embodiments, training comprises extracting from the multiple training images an observed illumination spectrum from a white patch in the image.

In some embodiments, training further comprises generating multiple sub-images from the multiple training images and minimising an error between the determined illumination spectrum and the observed illumination spectrum for the multiple sub-images.

In some embodiments, the error is based on a cubic smoothing spline function.

In some embodiments, the error is represented by an error function comprising a first summand based on a mean square error and a second summand representing a roughness penalty.

In some embodiments, the roughness penalty is based on a forward difference of output values.

In some embodiments, the neural network is based on ResNet.

In some embodiments, the output layer is a fully connected layer.

In some embodiments, the method further comprises processing the hyperspectral image based on the illumination spectrum.

Software, when executed by a computer, causes the computer to perform the above method.

A computer system for determining an illumination spectrum in a digital image, comprises a processor configured to apply a neural network to the digital image by:

calculating three-dimensional convolutions in one or more convolutional layers of the neural network, the three-dimensional convolutions comprising a convolution along a spectral dimension; and evaluating an output layer, connected to the one or more convolutional layers in the neural network, the output layer having multiple output values that each provide an intensity value for a respective band of the illumination spectrum of the digital image.

In some embodiments, the computer system further comprises an image sensor to generate the digital image and a storage medium to store the digital image and the illumination spectrum.

Optional features provided with reference to the method above are equally optional features to the computer system.

Figure 4:
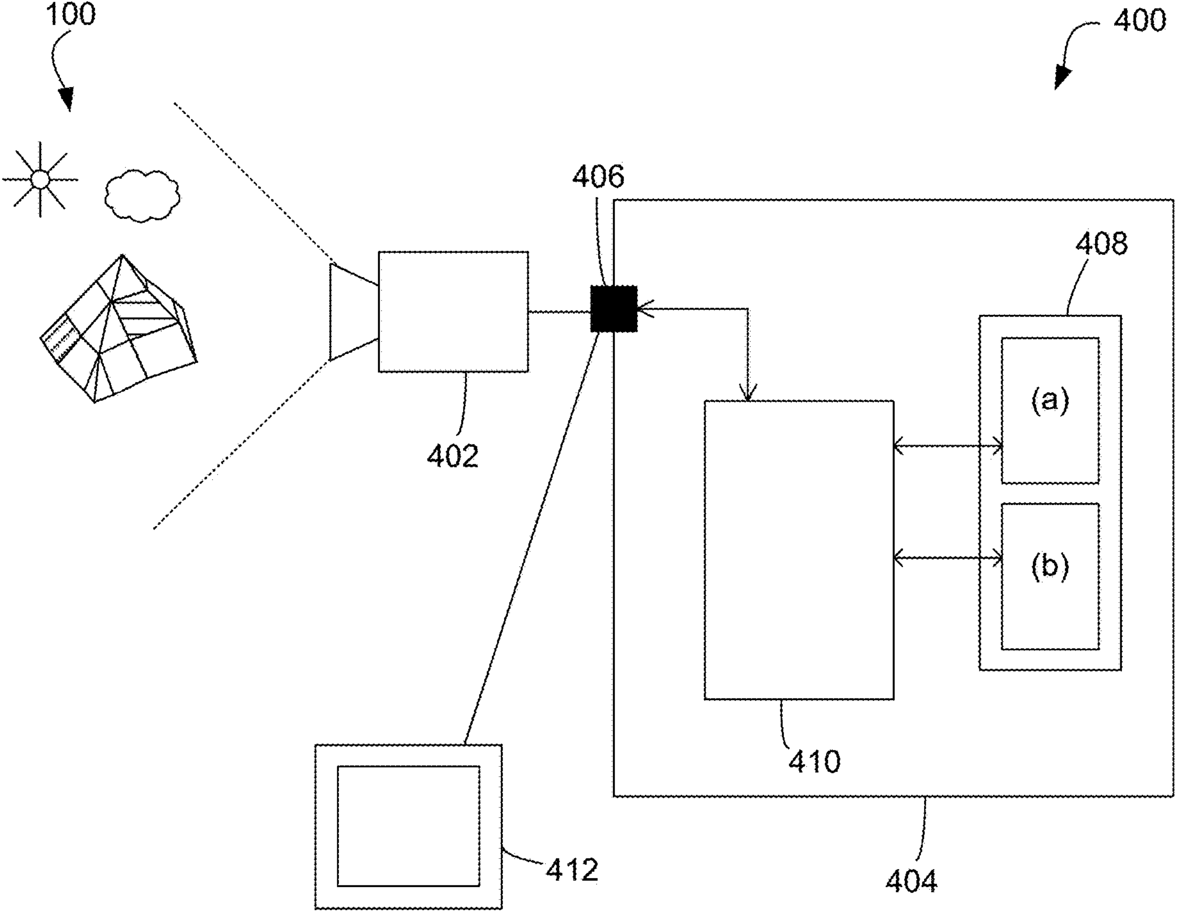

An example will now be described with reference to the following drawings:

FIG. 4 illustrates a computer system for estimating an illumination spectrum.

Figure 5:
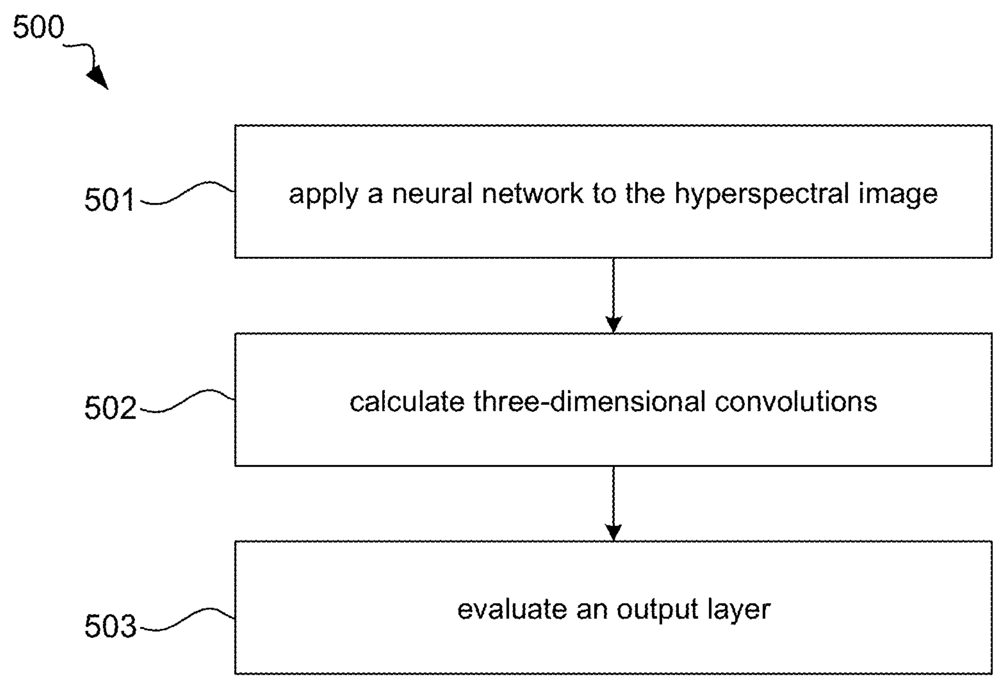

FIG. 5 illustrates a computer implemented method for determining an illumination spectrum in a digital image.

Figure 3:
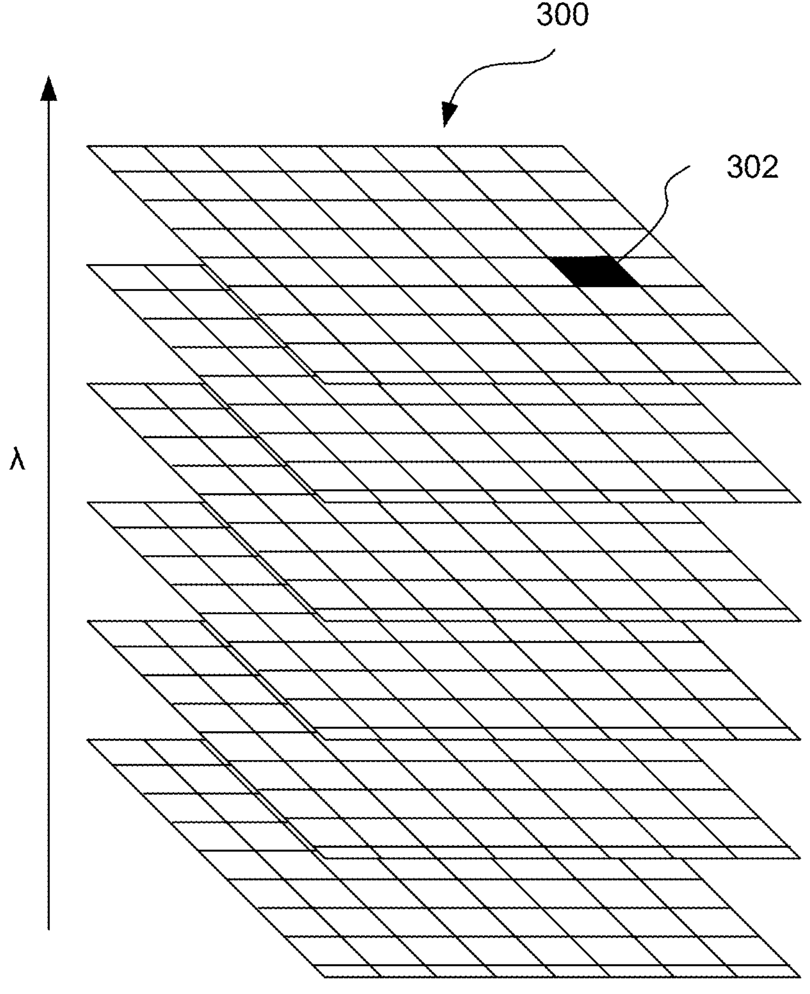
FIG. 3 illustrates a data structure for the multispectral image data according to the prior art.
Figure 6:
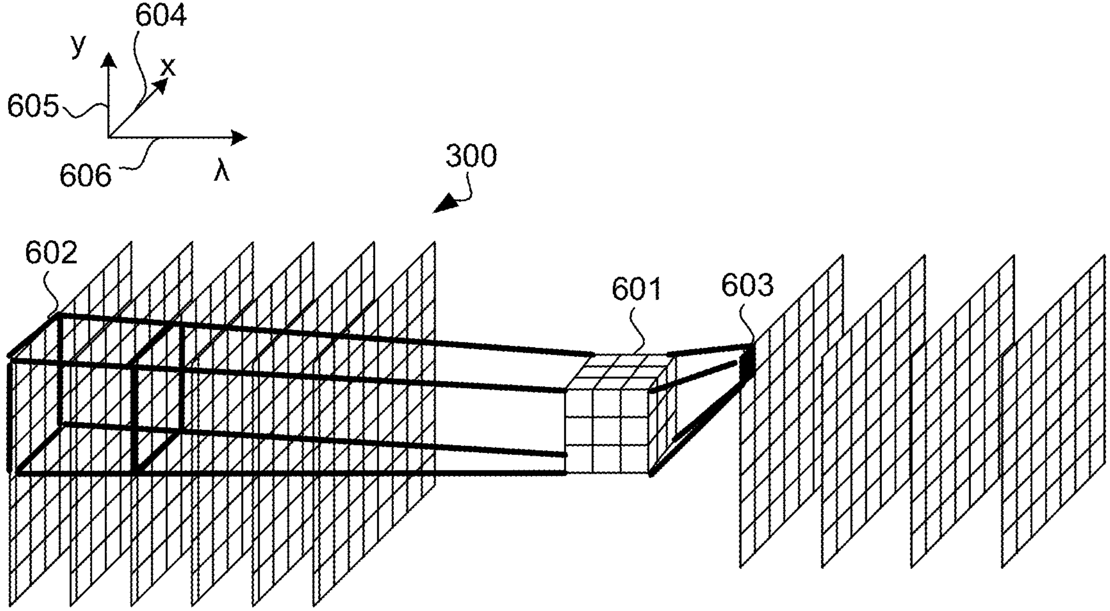

FIG. 6 illustrates a 3D convolution applied to the data structure from FIG. 3.

Figure 7:
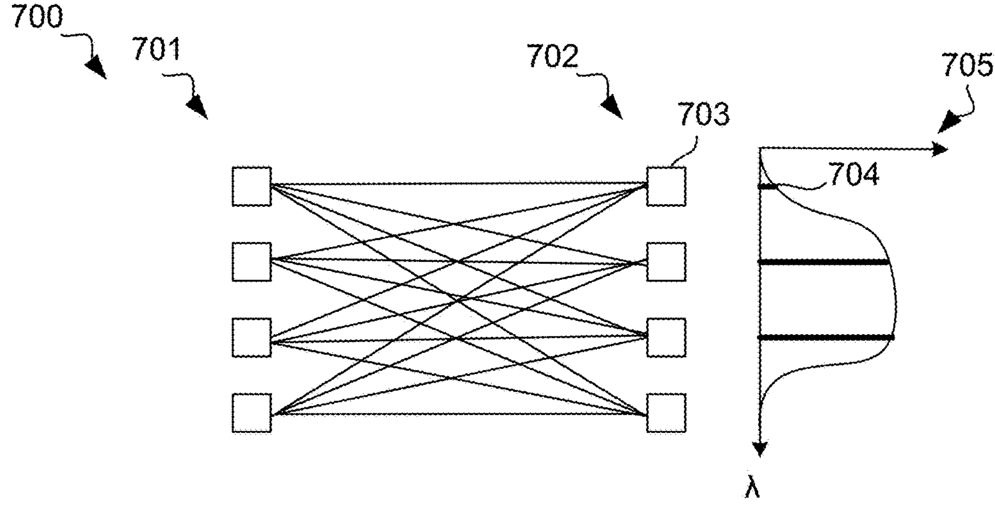

FIG. 7 illustrates a fully connected output layer.

Figure 8:
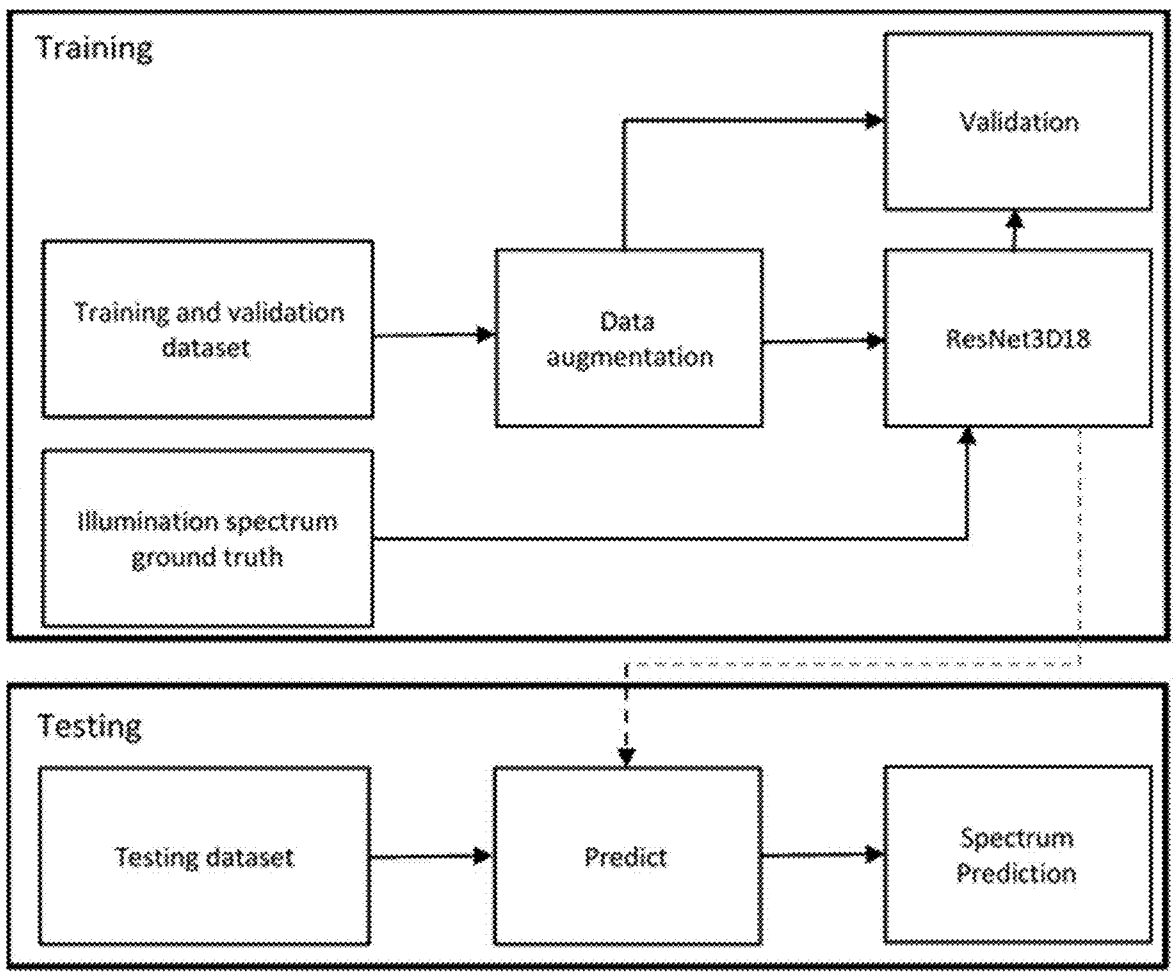

FIG. 8 illustrates a training and testing workflow for illumination spectrum recovery.

Figure 9:
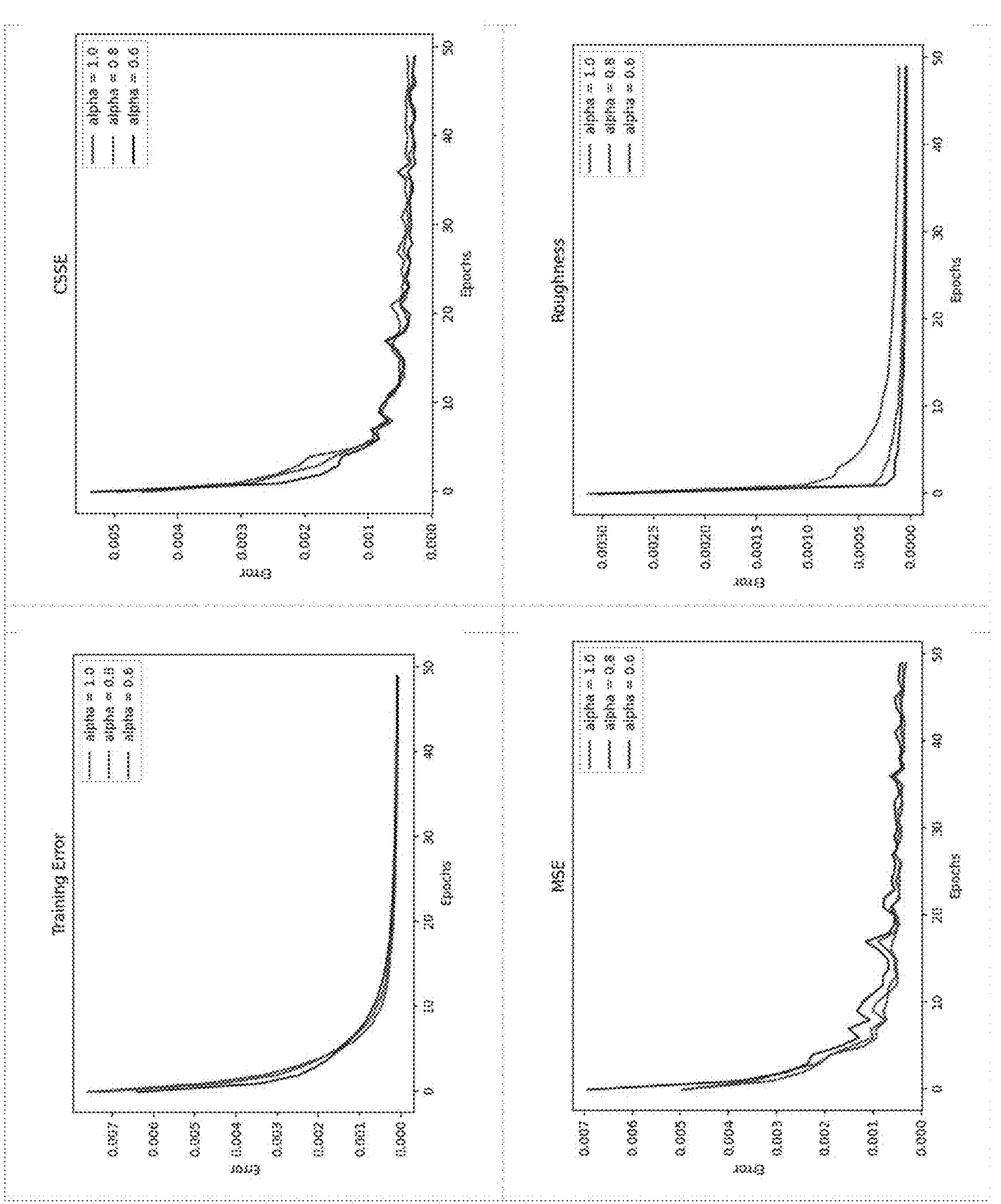

FIG. 9 illustrates training errors on the IllumNet dataset. Cubic Smoothing Spline Error, Mean Square Error and roughness errors are for the validation dataset.

Figures 10, 11:
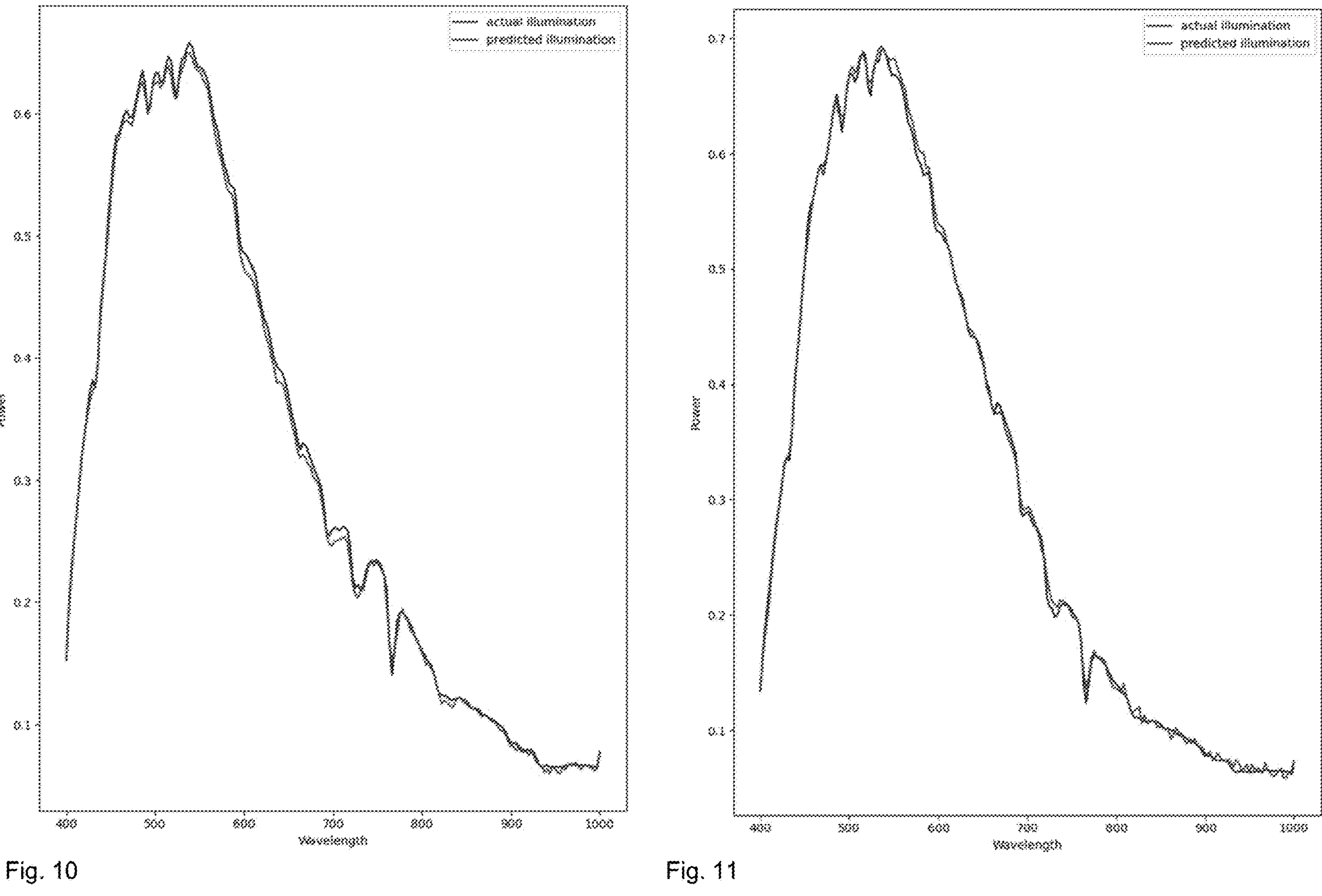

FIG. 10 illustrates a predicted illumination spectrum and a measured illumination spectrum for a scene outdoor and overcast.

FIG. 11 illustrates a predicted illumination spectrum and a measured illumination spectrum for a scene outdoor and sunny.

Figures 12, 13:
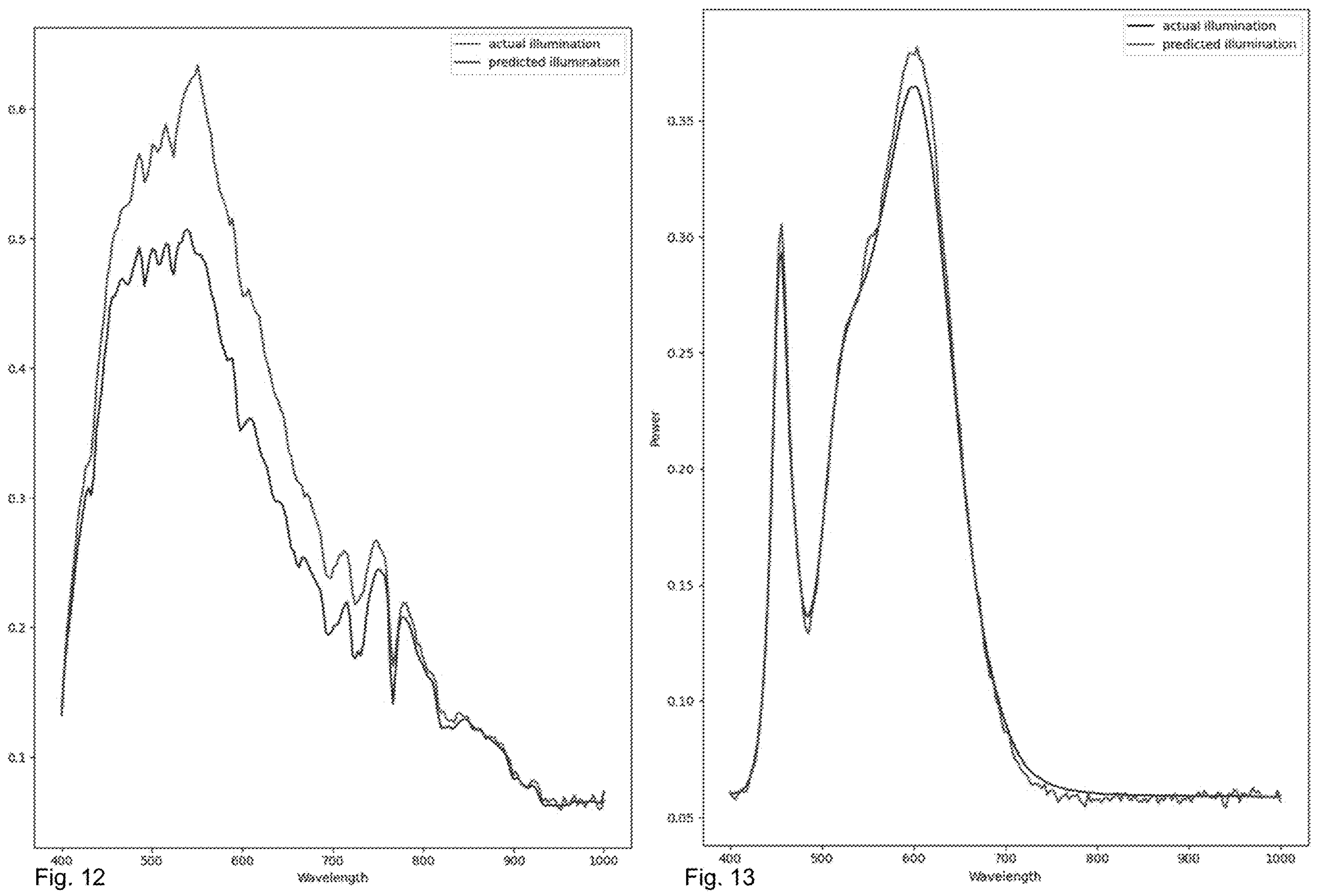

FIG. 12 illustrates a predicted illumination spectrum and a measured illumination spectrum for a scene outdoor and overcast.

FIG. 13 illustrates a predicted illumination spectrum and a measured illumination spectrum for a scene indoor and illuminated by LED.

Figures 14, 15:
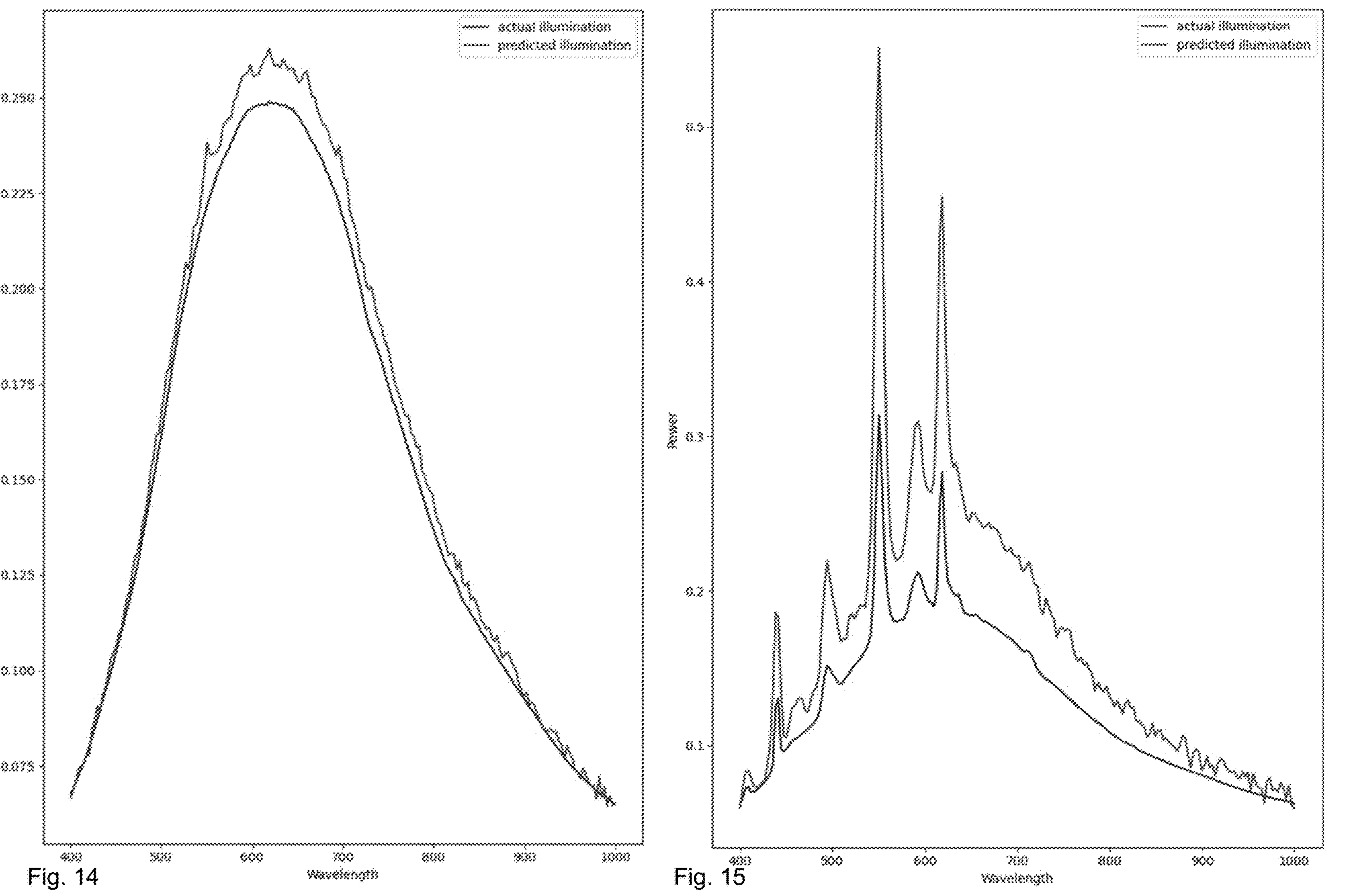

FIG. 14 illustrates a predicted illumination spectrum and a measured illumination spectrum for a scene indoor and illuminated by halogen.

FIG. 15 illustrates a predicted illumination spectrum and a measured illumination spectrum for a scene indoor and illuminated by a mixture of halogen and fluorescent.

DESCRIPTION OF EMBODIMENTS

This disclosure provides a method, including a neural network, to recover an illumination spectrum from a hyperspectral or multispectral image. An image is typically a digital image with multiple image pixels. Each image pixel is associated with multiple intensity values for light intensity at multiple respective frequencies. These pixel values may be calculated by a de-Bayering method. In the following description, the term 'pixel' may be replaced by 'point of the image' to denote that the individually addressable image elements may be computed based on multiple pixels. For example, the image resolution may be reduced by combining pixels and the method 500 is performed on the low-resolution image having multiple points instead of pixels. Unless noted otherwise, if the word 'pixel' is used it may equally be applicable to a 'point of the image'.

Computer System

Figure 1:
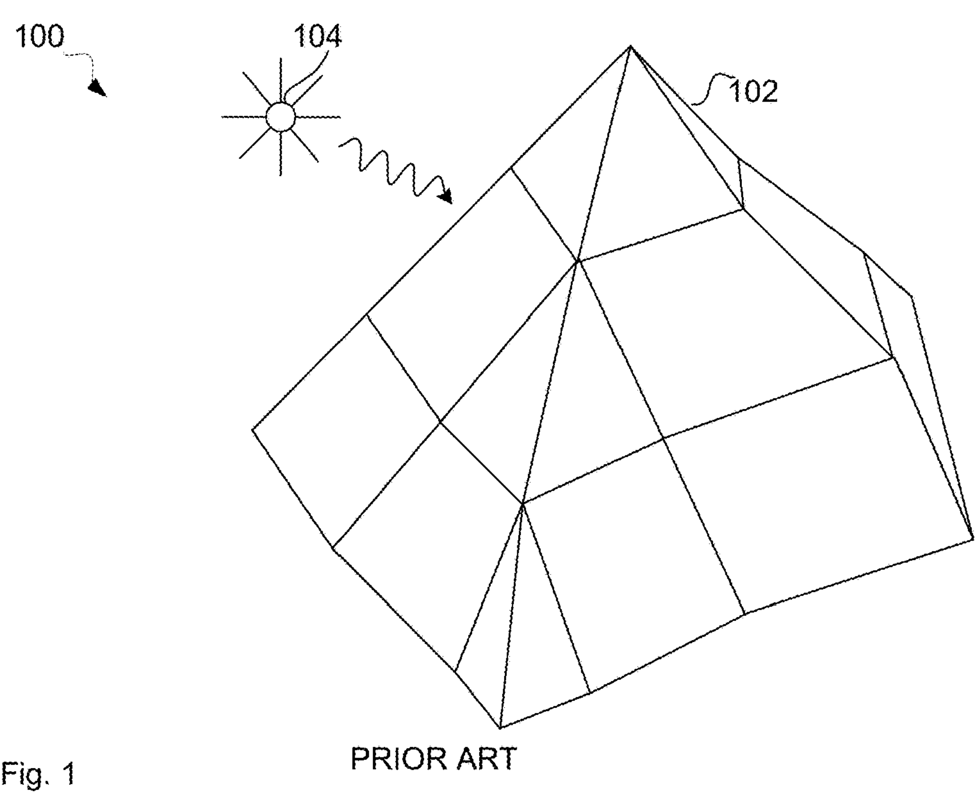
FIG. 1 illustrates an example scene according to the prior art.
Figure 2:
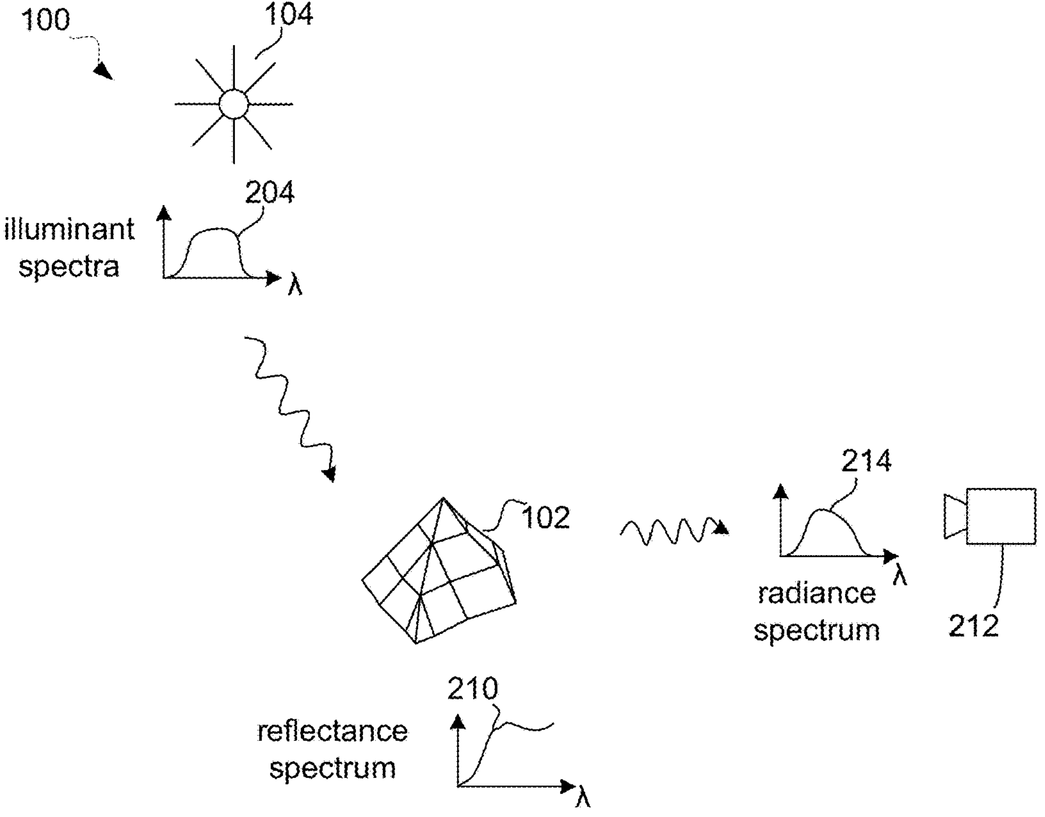
FIG. 2 illustrates the scene from FIG. 1 in more detail.

FIG. 4 illustrates a computer system 400 for estimating an illumination spectrum of an image of scene 100. Computer system 400 comprises a sensor 402 and a computer 404. In this example the sensor 402 is a hyperspectral or multispectral sensor that is able to capture an image of a scene 100 illuminated by three light sources as explained with reference to FIG. 1.

In one example, the computer system 400 is integrated into a handheld device such as a consumer camera and the scene 100 may be any scene on the earth, such as a tourist attraction, a person, an engineering structure or an agricultural area. The sensor 402 may have a number of bands that balances computational costs with accuracy. The sensor 402 may have as low as three bands (e.g., RGB) and as high as hundreds.

The computer 404 receives images from the sensor 402 via a data port 406 and the images are stored in local memory 408(*b*) by the processor 410. The processor 410 uses software stored in memory 408 (*a*) to perform the method shown in FIG. 5. The program memory 408(*b*) is a non-transitory computer readable medium, such as a hard drive, a solid state disk or cloud storage.

The processor 410 performs the method of estimating an illumination spectrum of the image by applying a trained neural network to the image. Processor 410 may use the illumination spectrum to perform white balancing or other image processing on the image and store an updated version of the image on the data store 408(*b*). In other examples, the processor 410 stores the white balancing data and/or the determined illumination spectrum on the datastore 408(*b*).

The software may provide a user interface that can be presented to the user on a monitor 412. The user interface is able to accept input from the user (i.e. touch screen). The user input is provided to the input/out port 406 by the monitor 412. The image is stored in memory 408(*b*) by the processor 410. In this example the memory 408(*b*) is local to the computer 404, but alternatively could be remote to the computer 404.

The processor 410 may receive data, such as image data, from data memory 408(*b*) as well as from the communications port 406. In one example, the processor 410 receives image data from the sensor 402 via communications port 406, such as by using a Wi-Fi network according to IEEE 802.11. The Wi-Fi network may be a decentralised ad-hoc network, such that no dedicated management infrastructure, such as a router, is required or a centralised network with a router or access point managing the network.

In one example, the processor 410 receives and processes the image data in real time. This means that the processor 410 determines the illuminant spectrum every time the image data is received from sensor 402 and completes this calculation before the sensor 402 sends the next image data update. This can be useful for live video processing.

Although communications port 406 is shown as single entity, it is to be understood that any kind of data port may be used to receive data, such as a network connection, a memory interface, a pin of the chip package of processor 410, or logical ports, such as IP sockets or parameters of functions stored on program memory 408 (*a*) and executed by processor 410. These parameters may be stored on data memory 408(*b*) and may be handled by-value or by-reference, that is, as a pointer, in the source code.

The processor 410 may receive data through all these interfaces, which includes memory access of volatile memory, such as cache or RAM, or non-volatile memory, such as an optical disk drive, hard disk drive, storage server or cloud storage. The computer system 404 may further be implemented within a cloud computing environment, such as a managed group of interconnected servers hosting a dynamic number of virtual machines.

It is to be understood that any receiving step may be preceded by the processor 410 determining or computing the data that is later received. For example, the processor 410 determines the image data, such as by filtering or de-Bayering (i.e. de-mosaicing) the raw data from sensor 402, and stores the image data in data memory 408(*b*), such as RAM or a processor register. The processor 410 then requests the data from the data memory 408(*b*), such as by providing a read signal together with a memory address. The data memory 408(*b*) provides the data as a voltage signal on a physical bit line and the processor 410 receives the image data via a memory interface.

Method

FIG. 5 illustrates a computer implemented method 500 for determining an illumination spectrum in a digital image as performed by processor 410. In other words, method 500 may serve as a blueprint or pseudo-code for software implemented in a particular programming language, such as C++, and stored on program memory 408 (*a*) as compiled machine readable code. The image is comprised of points of wavelength indexed spectral data, such as multispectral image data.

A digital image is a data structure that comprises for each of multiple points of the image (i.e. pixels) multiple colour value as shown in FIG. 3. Each of the colour values are represented by a digitally encoded value, such as a number from 0-255, which indicates the intensity at that pixel in that colour (i.e. band). The digital image may be stored in any of the available image formats, such as ENVI, jpg, tiff, png, bmp, gif and the like. The digital image may be transformed or modified before being processed by processor 410, including resize/rescaling, normalising, or other image pre-processing or conversion operations.

Instead of analysing a white reference area or fitting a reflectance model to the image, processor 410 applies 501 a neural network to the hyperspectral image. FIG. 6 illustrates an example neural network 600.

Processor 410 performs this by first calculating 502 three-dimensional convolutions 601 in one or more convolutional layers of the neural network, the three-dimensional convolutions comprise a convolution along a spectral dimension. Then, processor 410 evaluates an output layer 602, connected to the one or more convolutional layers in the neural network. The output layer has multiple output values that each provide an intensity value for a respective band of the illumination spectrum of the hyperspectral image.

Convolutions

Mathematically, a convolution is an integration function that expresses the amount of overlap of one function g as it is shifted over another function f. Intuitively, a convolution acts as a blender that mixes one function with another to give reduced data space while preserving the information. In terms of Neural Networks and Deep Learning, convolutions are filter (matrix/vectors) with learnable parameters that are used to extract low-dimensional features from an input data. They have the property to preserve the spatial or positional relationships between input data points. Convolutional neural networks exploits the spatially-local correlation by enforcing a local connectivity pattern between neurons of adjacent layers.

Intuitively, convolution is the step of applying the concept of sliding window (a filter with learnable weights) over the input and producing a weighted sum (of weights and input) as the output. The weighted sum is the feature space which is used as the input for the next layers.

For example, in a Face Recognition problem, the first few convolution layers learn the presence of key points in the input image, deeper convolution layers learn the edges and shapes, and a final convolution layer learns the face. In this example, the input space is first reduced to a lower dimensional space (representing information about points/pixels), then this space is reduced to another space containing (edges/shapes) and finally it is reduced to classify faces in the images. Convolutions can be applied in N dimensions.

Here, the convolutions are applied in three dimensions and FIG. 6 illustrates a 3D convolution applied to the data structure from FIG. 3. 3D convolutions apply a 3 dimensional filter to the dataset and the filter moves in 3-directions (x, y, z) to calculate the low level feature representations. Their output shape is a 3 dimensional volume space such as cube or cuboid.

In FIG. 6 a filter 601, which is a 3×3 filter in this example, calculates a weighted sum of pixels values. There are 9 weights, which are the coefficients of the filter. So the filter starts at an initial position 602 in the data structure 300, multiplies each pixel value with the respective filter coefficient and adds the results. Finally, the filter 601 stores the resulting number in an output pixel 603. Then, the filter moves by one pixel along one direction in the data structure 300 and repeats the calculation for the next pixel of the output image. That direction may be an x-dimension 604 or a y-dimension 605. Importantly, the filter 601 may also move along a spectral dimension 606. That is, the cubic 3×3×3 filter 601 adds pixel values along the spectral dimension 606 and also moves along the spectral dimension 606. Therefore, this operation is referred to as a convolution along a spectral dimension.

Output Layer

FIG. 7 illustrates an output layer 700, which is fully connected. The output layer has inputs 701 and outputs 702. The inputs 701 are the results from the previous convolutional layers. That is, the convolutional layer, such as in FIG. 6 is connected to the output layer 700 to provide the results to the output layer 700. However, the convolutional layer need not be connected directly to the output layer 700 in the sense that there may be further non-convolutional layer between the convolutional layer and output layer 700. For example, there may be a max-pool layer between the convolutional layer and the output layer 700.

The output layer has outputs 702 and each output provides a value of the estimated illumination spectrum at a respective wavelength. So for example, a first output 703, provides as output value, a first intensity 704 of the illumination spectrum. Together, the outputs provide the entire illumination spectrum 705. In other words, the outputs together provide discreet samples of the illumination spectrum 705. As described below, these output samples may be used for a spline interpolation.

In one example, the association between output 703 and a specific wavelength of the illumination spectrum is predetermined and may be an even distribution of outputs along the spectrum. In other examples, the association may also be trained to provide improved spectral resolution at certain bands.

It is finally noted that FIG. 7 shows a simplified example of only four inputs 702 and four outputs 703, noting that in most practical applications, the number of inputs and outputs is significantly higher (see example values below).

Taking FIG. 6 and FIG. 7 together, this disclosure provides a deep learning network to estimate the illumination spectrum of hyperspectral images under various lighting conditions.

Configuration

In one example, the input data size to the network is (B, C, D, H, W), where B is the batch size, C is the number of channels, D is the depth, H is the height and W is the width. For RGB images (e.g., for tracking, video segmentation), C is set to 3, corresponding to the number of channels in the image. In another example, C is set to 1 and D to number of bands/s. For one setup, the number of bands is 204 and s is 4 (i.e. D=51), this is mainly done due to memory constraints of the computer used to perform the network training.

The 3D convolution kernel (d, h, w) has both a spatial extent and a spectral extent. However, since the aim is to estimate the illumination spectrum, the depth of the kernel can be made longer than its width and height i.e., d>(h, w) and h=w.

The 3D max pooling kernel may be smaller than that of the 3D convolution kernel. This is done so that minute details in the illumination spectrum, such as the "spikiness" caused by the absorption bands, are not lost.

The output of the network is a vector with size corresponding to the number of bands in the hyperspectral image. Since the depth of the input image is sub-sampled, this network also has the capability of interpolating the input signal or perform spectral "superresolution". In one example, the depth of the input image is sub-sampled to 51 and the output has 204 output values.

In order to train the network, a training dataset can be created or an existing dataset such as IllumNet can be used. Images may be captured using a Specim IQ camera, or other cameras, under various illumination conditions, both indoor and outdoor. Outdoor images may be captured in sunny, overcast, and shady conditions and at different times of the day. For indoor images, halogen and LED light sources may be used, as well as mixed light sources, mainly halogen or LED and fluorescent. A ResNet18 network can be employed, but with the 2D kernel changed to a 3D kernel to suit the spectral nature of the data. As well as fitting the actual illumination spectrum well, the predicted illumination spectrum should also be smooth, and this is achieved by a cubic smoothing spline error cost function. Experimental results indicate that the trained model can infer an accurate estimate of the illumination spectrum.

Problem Definition

The radiance or raw image captured by a camera is converted to a reflectance image to study the material composition of a scene. The reflectance intensity at pixel (x, y,) for each band can be obtained by:

$$s(x, y, \lambda) = \frac{p(x, y, \lambda) - d(\lambda)}{l(\lambda) - d(\lambda)}$$

where $l(\lambda)$ is the incoming illumination at wavelength $\lambda$, $d(\lambda)$ is the dark reference and $p(x, y, \lambda)$ denotes the radiance intensity. The dark reference represents the baseline signal noise due to the camera's electronics. In the case of the Specim IQ camera, the camera measures this automatically. The most common way to obtain $l(\lambda)$ is to measure the illumination reflected off a white target reference in the scene.

The white reference contains material that has a reflectance close to 100% without any spectral features. When the white reference is measured in the same illumination and measurement geometry and distance as the rest of the scene, the signal from the white reference target can be assumed to only contain the signal from the illumination. That is, during training the measurement from the white target can be used as the illumination spectrum 705 and the network parameters are optimised such that the outputs 702 provide values that are as close as possible to the illumination spectrum 705 from the white reference target. In that sense, the spectrum from the white reference target is akin to a label in supervised learning. The white reference target also includes information about the spectral response of the hyperspectral camera, that is, how the camera will affect the measured spectrum.

The goal of automatic illumination recovery is to use deep learning to recover the illumination instead of a white reference target, that is, after training, the trained network can be applied to an input image without a white reference target.

Data Augmentation

The illumination recovery dataset consisted of 1004 images, captured with various illumination sources. In one example, the images have a size of 512×512 pixels. Of those images, 80% was set aside for training and validation (70% for training and 10% for validation) and 20% for testing. For the training dataset, the white reference targets (e.g., Spectralon) were cropped to avoid bias during training and n 256×256 sub-images were randomly selected from each image. Each cropped image was then rotated three times (i.e., at 90°, 180° and 360°). To avoid any bias towards either indoor or outdoor images, the training dataset contained approximately an equal number of indoor and outdoor images. The resulting training dataset contained about 40,000 images.

Network Design

This disclosure can be implemented with several Convolutional Neural Networks (CNN) to recover the illumination spectrum. These include:

VGG16 (as described in K. Simonyan and A. Zisserman, "Very Deep Convolutional Networks for Large-Scale Image Recognition," in International Conference on Learning Representations, 201), ResNet18 (as described in K. He, X. Zhang, S. Ren and J. Sun, "Deep Residual Learning for Image Recognition," in IEEE Conference on Computer Vision and Pattern Recognition, 2016) and ResNet101 (as described in K. He, X. Zhang, S. Ren and J. Sun, "Deep Residual Learning for Image Recognition," in IEEE Conference on Computer Vision and Pattern Recognition, 2016).

The references above are included herein in full by reference.

VGG16 produced large model files, approximately 1 GB in size, which may not be suitable for some portable applications. In some experiments, validation and testing results showed that ResNet18 performs better than ResNet101, probably because it has a shorter network, and a shorter network is more appropriate for the example dataset.

The main utility for ResNet is the detection of objects in an RGB image. Since the methods disclosed herein are to co-opt spectral features to recover the illumination of a hyperspectral image, the original ResNet is modified to use 3D convolutions, instead of 2D convolutions. It is noted that other CNNs may equally be modified.

Experimental results demonstrated that significantly better results are obtained by using 3D convolutions. We refer to the modified ResNet network as ResNet3D18. The architecture of ResNet3D18 for IllumNet is shown in Table 1. The building blocks of the network, along with the number of nested blocks, are listed in the third column. Note that conv1 has an input channel of 1 and a depth of 51, which is the number of image bands downsampled (by nearest neighbour) by 4. This was done to reduce GPU memory usage. Downsampling is performed by conv31, conv41, and conv51 with a stride of 2. The last layer is a fully connected layer with an output of 204, corresponding to the number of bands in the images. The last layer upsamples the spectrum back to the number of bands in the input image.

TABLE 1

Architecture of ResNet3D18 for IllumNet.

| Layer name | Output size (channels, depth, W, H) | Building blocks |
| --- | --- | --- |
| conv1 | 64 × 26 × 128 × 128 | 11 × 7 × 7, 1 input channel, 51 input depth, 64 output channels, stride 2 |
| | 64 × 13 × 64 × 64 | Max pool 3 × 3 × 3, stride 2 |
| conv2_x | 64 × 13 × 64 × 64 | $\begin{bmatrix} 7\times3\times3, & 64 \\ 7\times3\times3, & 64 \end{bmatrix}\times2$ |
| conv3_x | 128 × 7 × 32 × 32 | $\begin{bmatrix} 7\times3\times3, & 128 \\ 7\times3\times3, & 128 \end{bmatrix}\times2$ |
| conv4_x | 256 × 4 × 16 × 16 | $\begin{bmatrix} 7\times3\times3, & 256 \\ 7\times3\times3, & 256 \end{bmatrix}\times2$ |
| conv5_x | 512 × 2 × 8 × 8 | $\begin{bmatrix} 7\times3\times3, & 512 \\ 7\times3\times3, & 512 \end{bmatrix}\times2$ |
| | | Average pool 3D, 204-fc, regression CSSE loss |

Although a specific example of a layer configuration is shown above, it is noted that a wide range of different configurations is equally applicable. That is, the number of input channels is generally N and the value of 51 above has been used for a particular hardware setup and other examples may be between 3 and 1,000 or even outside that range. Further, the number of 204 output channels is just one example and that number could be widely different, such as between 3 and 1,000 output channels, for example, or even outside that range.

The neural network could have more layers (i.e. be 'deeper') or have a different size of filters or other different parameters. For example, there could be multiple combinations of convolutional layers and max pool layers before the data reaches the output layer. The neural network may comprise one or more of: Convolution layers, Pooling layers, Recurrent layers, Preprocessing layers, Normalization layers, Regularization layers, Attention layers, Reshaping layers, Merging layers, Locally-connected layers or Activation layers. Possible neural networks may include Xception, EfficientNet B0 to B7, VGG16 and VGG19, ResNet and ResNetV2, MobileNet and MobileNetV2, DenseNet, NasNetLarge and NasNetMobile, Inception V3, InceptionResNetV2.

Further, the neural network may be implemented in Keras (https://keras.io/) or other software tools or implementation frameworks.

Implementation

In one example, the weights are not initialised with any pre-trained network and are trained from scratch. Stochastic gradient descent (SGD) was used with the mini-batch size of 4. Experimental results indicated that low mini-batch values gave better results. The learning rate was set to 0.005, momentum to 0.9 and the models were trained for 100 iterations.

The training and testing workflow of our illumination recovery method is shown in FIG. 8.

Loss Function

CNNs are trained using an optimization process that employs a loss function to calculate the model error. It is possible to cast the illumination spectrum recovery problem as a regression problem. Example loss functions for regression problems include Mean Squared Error (MSE) and Mean Absolute Error (MAE). The MSE and MAE are computed by:

$$MSE = \frac{1}{N}\sum_{i=0}^{N-1}(y_i - \hat{y}_i)^2$$

and $$MAE = \frac{1}{N}\sum_{i=0}^{N-1}|y_i - \hat{y}_i|$$

where N is the number of data points, $y_i$ is the spectrum value from the ground truth data and $\hat{y}_i$ is the predicted value for data point i. The results showed that both MAE and MSE produced reasonable results, with the predicted spectrum following the shape of the ground truth spectrum well. However, MSE and MAE do not take into consideration the "smoothness" of the spectrum curve and produce rough curves that could result in poor reflectance images.

To obtain a predicted spectrum that is smooth and, at the same time, fits the ground truth spectrum well, processor 410 uses a cubic smoothing spline function [3] [4]. Smoothing splines are function estimates, $\hat{f}(x)$, obtained from a set of noisy observations $y_i$ of the target $f(x_i)$ to balance a measure of goodness of fit of $\hat{f}(x)$ to $y_i$ with a derivative based measure of the smoothness of $\hat{f}(x)$. The functions provide a means of smoothing noisy $x_i$, $y_i$ data.

The cubic smoothing spline estimate $\hat{f}$ of the function $f$ is defined to be the minimiser (over the class of twice differentiable functions) of $$\sum_{i=0}^{N-1}(y_i - \hat{f}(x_i))^2 + \lambda\int\hat{f}''(x)^2dx$$

where $\lambda \geq 1$ is a smoothing parameter, controlling the roughness of the function estimate. Note that, $\hat{f}''$ measures the roughness of the function estimate and $$\sum_{i=0}^{n-1} (y_i - \hat{f}(x_i))^2,$$

measures the sum of the squared errors of the function estimate and the observations.

The predicted values are defined as $\Delta\hat{y}_{i+1} = \hat{y}_{i+1} - \hat{y}_i$.

Using the above equation, the Cubic Smoothing Spline Error (CSSE) function is adapted as a loss function for ResNet3D18 as $$CSSE = \alpha \frac{1}{N} \sum_{i=0}^{N-1} (y_i - \hat{y}_i)^2 + (1 - \alpha) \frac{1}{K} \sum_{j=0}^{K-1} (\Delta\hat{y}_{i+1} - \Delta\hat{y}_i)$$

where $0 \leq \alpha \leq 1$. Note that $$\frac{1}{N} \sum_{i=0}^{N-1} (y_i - \hat{y}_i)^2$$

is the MSE. As $\alpha \rightarrow 0$, the roughness penalty becomes paramount, and conversely, as $\alpha \rightarrow 1$, CSSE approaches the MSE. Further, note that $(\Delta\hat{y}_{i+1} - \Delta\hat{y}_i)$ is the second derivate (or difference) of $\hat{y}_{i+1}$ and $\Delta\hat{y}_{i+1}$ is the first derivate (or difference) of the predicted values. $(\Delta\hat{y}_{i+1} - \Delta\hat{y}_i)$ measures "smoothness".

The value of $\alpha$ is chosen such that the predicted spectrum is not noisy, and at the same time, is not oversmoothed. It is undesirable that the smoothness of the predicted spectrum is less than the smoothness of the actual spectrum because significant absorption bands, that are usually spikey, might become attenuated.

Experimental Results

FIG. 9 shows the error for MSE, roughness and CSSE for various $\alpha$ values on validation data as well as the training error. An interesting observation from the plots is that when $\alpha$=0.6 and $\alpha$=0.8, the roughness converges rapidly. When $\alpha$=1.0, the roughness error does still converge even though we are not minimising for roughness here. Understandably, the roughness values for $\alpha$=1.0 are always higher.

Table 2 shows the results for the test data for various metrics and $\alpha$ after 50 epochs. The test set contains 398 full sized images, and this includes both indoor and outdoor images. Interestingly, the lowest MSE is obtained when $\alpha$=0.8. The lowest roughness is obtained when $\alpha$=0.6, and this leads to the lowest CSSE. However, using the lowest CSSE to select the best a is not a good idea since a low roughness value might lead to over smoothness of the predicted illumination spectrum. Over smoothing the predicted illumination spectrum may result in eliminating significant absorption bands in the spectrum. The actual average roughness of the test dataset is 0.0000585 and the closest predicted roughness value to this is when $\alpha$=0.8. The roughness value of $\alpha$=1.0 is significantly higher, suggesting that a higher roughness value also leads to a higher MSE. The a can be fine-tuned further by training for values $0.6 < \alpha < 1.0$. However, for the rest of this disclosure we will show results for $\alpha$=0.8

TABLE 2

Results for the test dataset for various metrics and smoothing parameter.

| | α | | |
|---|---|---|---|
| Metric | 0.6 | 0.8 | 1.0 |
| MAE | 0.0349486 | 0.0343797 | 0.0359198 |
| MSE | 0.0041325 | 0.0039423 | 0.0044582 |
| Roughness | 0.0000346 | 0.0000545 | 0.0001334 |
| CSSE | 0.0024933 | 0.0031648 | 0.0044581 |

FIG. 10 to FIG. 15 depict the actual and predicted illumination spectrums for images captured indoor and outdoor under various illumination conditions. In most cases, the predicted illumination spectrum is a close match to that of the actual illumination spectrum. In FIG. 12, even though the shape of the two spectra are very similar, their magnitudes are different. This is probably caused by the non-uniformity of the lighting; some regions of the scene are darker than others. The actual illumination spectrum is the illumination spectrum from the white target, whereas the predicted illumination spectrum could be the average illumination spectrum of the scene. The only way of measuring that is by using multiple white targets in the scene.

FIG. 15 shows the result of mixing different lighting sources. The image was captured in a room with ceiling fluorescent lights and a halogen light source directed at the scene. The spectrum of fluorescent light is spikey due to the use of phosphors in the bulb to attenuate the UV light emitted by the mercury vapour. The actual illumination spectrum is a combination of halogen and fluorescent spectra. The shape of the predicted spectrum is very similar to that of the actual spectrum, but with a different magnitude, and is slightly rougher. This shows that the proposed illumination recovery method can predict a reasonably accurate illumination spectrum even under challenging lighting conditions.

CONCLUSION

Disclosed herein are methods to recover the illumination spectrums of hyperspectral images captured by any camera. A dataset called IllumNet, was created. The dataset contains 1004 images captured both indoor and outdoor, under various lighting sources. The task of illumination recovery is formulated as a regression analysis problem and a deep learning network, based on ResNet18 is disclosed. ResNet18 is modified to use 3D kernels that better suit the 3D nature of spectral data. A cubic smoothing spline error function is used as the loss function in the disclosed deep learning framework. This enables the control of the fit and roughness of the predicted spectrum. Experimental results indicate that the disclosed deep learning method can recover the illumination spectrum of images.

Dataset

We used the Specim IQ (Specim Ltd., Oulu, Finland) hyperspectral camera to capture images. The Specim IQ is a handheld hyperspectral camera, which performs hyperspectral data capturing, illumination and reflectance recovery, and visualisation of classification results in one single integrated unit. The sensor uses the push-broom mechanism to capture an image and each image cube is composed of 204 bands with a spatial resolution of 512×512 pixels. The wavelength range of the camera is 400-1000 nm.

The illumination dataset, IllumNet, consists of 1004 images and includes images captured for building attribute and material classification. The images were captured under various lighting conditions and sources, namely sunlight, shadow/overcast, halogen, LED, fluorescent and mixture. The outdoor images were captured at various times of the day to account for changes in sunlight's spectrum. For indoor images, a variety of objects were used, including leaves, fruits, rocks, paper, biscuits, metal, plastic etc, to create complex and diverse scenes. To avoid bias during the training process, the white reference panel was cropped out from all images.

It is noted that the training set is not exhaustive. For example, it does not include images captured in other geographic locations or the use of lighting from different light manufacturers. However, the proposed deep learning network is appropriate for general illumination spectrum recovery and the network can be retrained with other data to suit the needs of the user and other application scenarios.

It will be appreciated by persons skilled in the art that numerous variations and/or modifications may be made to the above-described embodiments, without departing from the broad general scope of the present disclosure. The present embodiments are, therefore, to be considered in all respects as illustrative and not restrictive.

The invention claimed is:

1. A method for determining an illumination spectrum in a digital image, wherein the digital image is a hyperspectral image, the method comprising:
applying a neural network to the digital image by:
calculating three-dimensional convolutions in one or more convolutional layers of the neural network, the three-dimensional convolutions comprising a convolution along a spectral dimension, and each of the one or more convolutional layers comprises a convolution filter having a depth, a height and a width, wherein the depth of the convolution filter is greater than the height of the convolution filter and greater than the width of the convolution filter; and
evaluating an output layer, connected to the one or more convolutional layers in the neural network, the output layer having multiple output values that each provide an intensity value for a respective band of the illumination spectrum of the digital image.

2. The method of claim 1, further comprising training the neural network by applying a smoothing function to the output values of the output layer to calculate a cost value that is to be minimised during training.

3. The method of claim 2, wherein the smoothing function comprises a cubic spline approximation to the output values of the output layer.

4. The method of claim 1, further comprising down-sampling bands of the digital image, wherein the one or more convolutional layers are configured to down-sample the bands of the digital image.

5. The method of claim 1, further comprising up-sampling a result of the convolutional layer.

6. The method of claim 1, further comprising training the neural network on multiple training images.

7. The method of claim 6, wherein training comprises extracting from the multiple training images an observed illumination spectrum from a white patch in the image, and wherein training further comprises generating multiple sub-images from the multiple training images and minimising an error between the determined illumination spectrum and the observed illumination spectrum for the multiple sub-images.

8. The method of claim 7, wherein the error is based on a cubic smoothing spline function.

9. The method of claim 8, wherein the error is represented by an error function comprising a first summand based on a mean square error and a second summand representing a roughness penalty.

10. The method of claim 9, wherein the roughness penalty is based on a forward difference of output values.

11. The method of claim 1, wherein the neural network is based on ResNet.

12. The method of claim 1, wherein the output layer is a fully connected layer.

13. The method of claim 1, further comprising processing the digital image based on the illumination spectrum.

14. The method of claim 13, wherein processing the digital image comprises calculating a reflectance image by normalising the digital image in relation to the illumination spectrum.

15. The method of claim 1, wherein the neural network comprises a max pooling layer, the max pooling layer comprising a filter having a size that is smaller than the convolution filter.

16. A non-transitory, computer readable medium with program code stored thereon that, when executed by a computer, causes the computer to perform the method of claim 1.

17. A computer system for determining an illumination spectrum in a digital image, wherein the digital image is a hyperspectral image, the computer system comprising a processor configured to apply a neural network to the digital image by:
calculating three-dimensional convolutions in one or more convolutional layers of the neural network, the three-dimensional convolutions comprising a convolution along a spectral dimension, and each of the one or more convolutional layers comprises a convolution filter having a depth, a height and a width, wherein the depth of the convolution filter is greater than the height of the convolution filter and greater than the width of the convolution filter; and
evaluating an output layer, connected to the one or more convolutional layers in the neural network, the output layer having multiple output values that each provide an intensity value for a respective band of the illumination spectrum of the digital image.

18. The computer system of claim 17, further comprising an image sensor to generate the digital image and a storage medium to store the digital image and the illumination spectrum.

* * * * *